United States Patent [19]

Klomp

[11] Patent Number: 4,539,954

[45] Date of Patent: Sep. 10, 1985

[54] SELECTIVE ASYMMETRIC SWIRL INTAKE PORT

[75] Inventor: Edward D. Klomp, Mt. Clemens, Mich.

[73] Assignee: General Motors Corporation, Detroit, Mich.

[21] Appl. No.: 665,712

[22] Filed: Oct. 29, 1984

[51] Int. Cl.³ .............................................. F01L 3/06
[52] U.S. Cl. ...................... 123/188 VA; 123/188 M; 123/306
[58] Field of Search ........... 123/188 VA, 188 M, 306, 123/590

[56] References Cited

U.S. PATENT DOCUMENTS

| | | | |
|---|---|---|---|
| 2,920,613 | 1/1960 | Vogel et al. | 123/188 M |
| 3,035,558 | 5/1962 | Wiebicke et al. | 123/188 M |
| 3,408,992 | 11/1968 | Von Seggern et al. | 123/188 M |
| 3,868,940 | 3/1975 | Kirchweger | 123/188 M |
| 4,137,886 | 2/1979 | Hiramatsu | 123/188 VA |
| 4,309,969 | 1/1982 | Matthes | 123/188 M |
| 4,320,725 | 3/1982 | Rychlik et al. | 123/188 M |
| 4,381,743 | 5/1983 | Mair | 123/188 M |
| 4,398,511 | 8/1983 | Nemazi | 123/188 M |
| 4,424,777 | 1/1984 | Klomp | 123/188 VA |
| 4,428,334 | 1/1984 | Klomp | 123/188 M |
| 4,432,312 | 2/1984 | Klomp et al. | 123/188 VA |

FOREIGN PATENT DOCUMENTS

| | | | |
|---|---|---|---|
| 55-216 | 5/1979 | Japan | 123/188 M |
| 55-40277 | 3/1980 | Japan . | |
| 62362 | 4/1983 | Japan | 123/188 M |
| 131302 | 8/1983 | Japan | 123/188 M |
| 2041443 | 9/1980 | United Kingdom | 123/188 M |

Primary Examiner—Ira S. Lazarus
Attorney, Agent, or Firm—Robert J. Outland

[57] ABSTRACT

Cylinder intake charge swirl is accentuated by selectively directing flow past swirl generating vanes in the intake port which are closest to the cylinder wall and reducing the flow past swirl generating vanes furthest from the cylinder wall. This may be accomplished by utilizing asymmetrically variable swirl vanes arranged to reduce flow at lower engine loads through passages furthest from the cylinder wall and encourage flow through swirl directed passages closer to the cylinder wall.

4 Claims, 5 Drawing Figures

VARIABLE GEOMETRY VANES WITH NON-UNIFORM CIRCUMFERENTIAL SPACINGS FOR INCREASED SWIRL STRENGTH

SELECTIVE ASYMMETRIC SWIRL INTAKE PORT

TECHNICAL FIELD

This invention relates to internal combustion engines having variable cylinder charge swirl developing means and, more particularly, to the provision of asymmetric selective intake swirl vanes in engine intake ports.

BACKGROUND

Some arrangements for providing variable swirl vanes in engine intake ports are disclosed in my U.S. Pat. Nos. 4,424,777 and 4,432,312, the latter filed jointly with David A. Stevens. Selective control of location and volume of flow in an intake port is disclosed in my U.S. Pat. No. 4,428,334. All of these patents are assigned to the assignee of the present invention.

SUMMARY OF THE INVENTION

The present invention followed my further study of the flow stand performance of fixed and variable swirl vanes in intake ports. As part of this work, the flow of air to selected passages formed by symmetrically arranged swirl vanes in an intake port was blocked off to determine the effect on swirl and air flow in the intake port. It was found that opening only passages to swirl vanes near the cylinder wall at low cylinder air flows can substantially enhance the swirl rate while opening only passages to swirl vanes away from the cylinder wall will significantly reduce swirl as compared to the amount of swirl in the combustion chamber when all the passages are open.

By extension of these concepts, the present invention involving asymmetric selective swirl intake ports was envisioned to include the provision of variable swirl vanes in which the degree of opening or closing of passages by the various vanes is selectively adjusted to increase or decrease cylinder swirl under varying load conditions. Thus, it is within the scope of the invention to vary the rate of swirl in an engine combustion chamber by selective blocking of various swirl passages and further to accomplish this purpose through the use of selectively actuated variable swirl vanes, or other similar devices, disposed within an intake port. In particular, it is a feature of the invention to increase cylinder swirl in operation of an engine by directing all or a major portion of the cylinder intake flow through variable vane controlled passages in the portion of the port nearest the cylinder wall.

These and other features and advantages of the invention will be more fully understood from the following description of an exemplary embodiment taken together with the accompanying drawings.

BRIEF DRAWING DESCRIPTION

DETAILED DESCRIPTION

Figure 1:
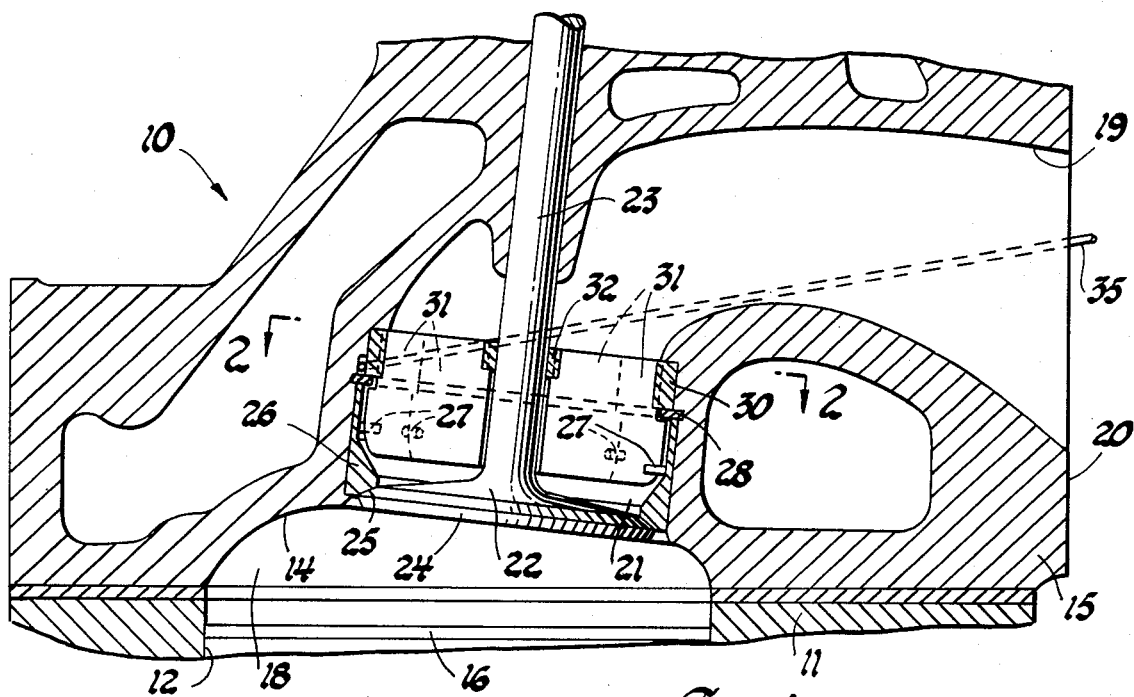
FIG. 1 is a fragmentary cross-sectional view through an engine cylinder and intake port having selective swirl vanes in accordance with the invention.

Referring now to the drawings in detail numeral 10 generally indicates an internal combustion engine having means in accordance with the invention. Engine 10 includes a cylinder block 11 defining a plurality of cylinders 12, only one of which is shown. The end of each cylinder 12 is closed by a recessed end wall 14 formed within a cylinder head 15 that is seated on the cylinder block. A piston 16 is reciprocably disposed in each cylinder 12 and defines therewith, and with the recessed end wall 14 a combustion chamber 18 at the cylinder closed end. The engine is conventionally provided with valve controlled exhaust ports not shown opening through the cylinder end walls 14.

In accordance with the invention, each of the cylinders is also provided with an intake port 19 extending through the cylinder head from an outer wall 20 to an inner end 21 that opens through the cylinder end wall 14 to the combustion chamber 18. An intake valve 22 reciprocably supported in the cylinder head and a head 24 that seats against a valve seat 25, provided on a valve seat insert 26 at the end of the port, to control opening and closing of the port. The valve seat insert 26 is stationary and supports eight equiangularly spaced pins 27 which extend a short distance radially into the port periphery from the mid portion of the valve seat insert for a purpose to be subsequently described.

Above the valve seat insert, a snap ring 28 in the port 19 supports a movable ring 30 which is rotatable about the valve axis and carries eight equiangularly spaced flexible vanes 31. The tops of the vanes 31 are secured to the inner edges of the ring 30 as well as to the outer edges of a collar 32 rotatably disposed around the stem 23 of the intake valve 22. The vanes 31 extend downwardly from the supporting ring and collar toward the intake valve, with the outer edges of the vanes engaging the stationary pins 27.

At its outer periphery, the ring 30 is engaged by a wire or cable 35 that extends through the cylinder head 15 and is reciprocably actuatable to rotate the ring 30, the associated vanes 31 and the collar 32 through a predetermined limited angular motion.

Figure 2:
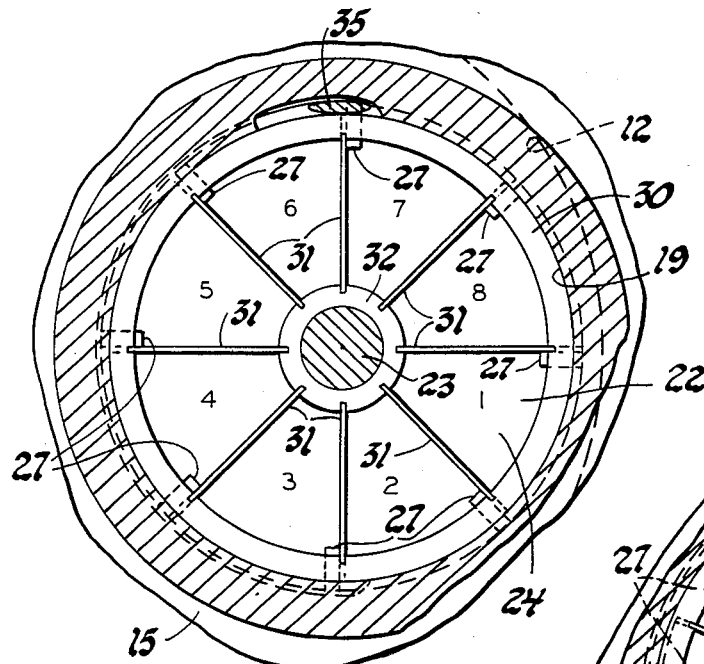
FIG. 2 is a cross-sectional view showing the swirl vanes in the fully open position from the plane indicated by the line 2—2 of FIG. 1.
Figure 3:
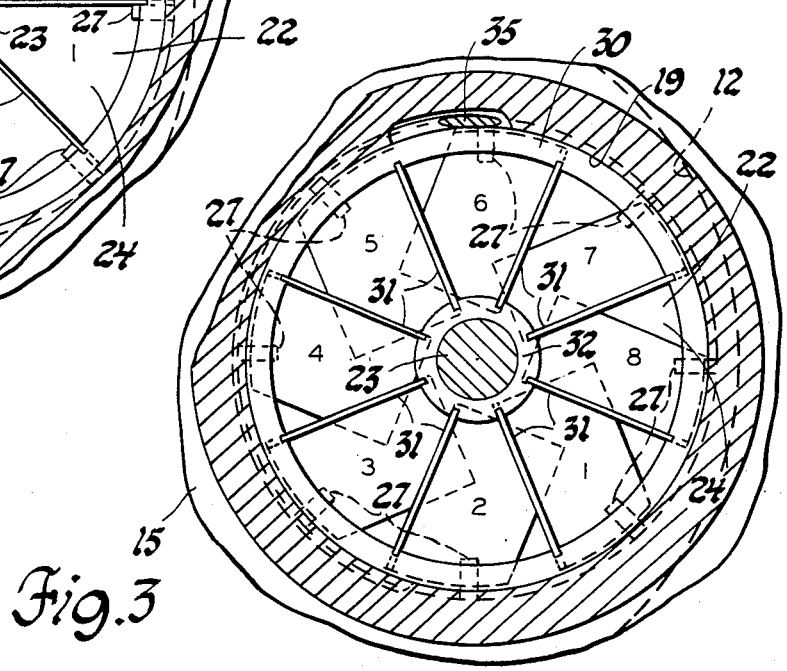
FIG. 3 is a cross-sectional view similar to FIG. 2 but showing the swirl vanes in a selectively closed position.

This function is partially illustrated in FIGS. 2 and 3. FIG. 2 shows the vanes 31 in their fully opened positions extending essentially vertically downwardly alongside the pins 27. FIG. 3, on the other hand, shows the ring 30 rotated clockwise against the pins 27 to cause flexing of the vanes 31 into closed or partially closed positions, wherein flow through the passages defined between the vanes is blocked to a greater or less degree.

Figure 4:
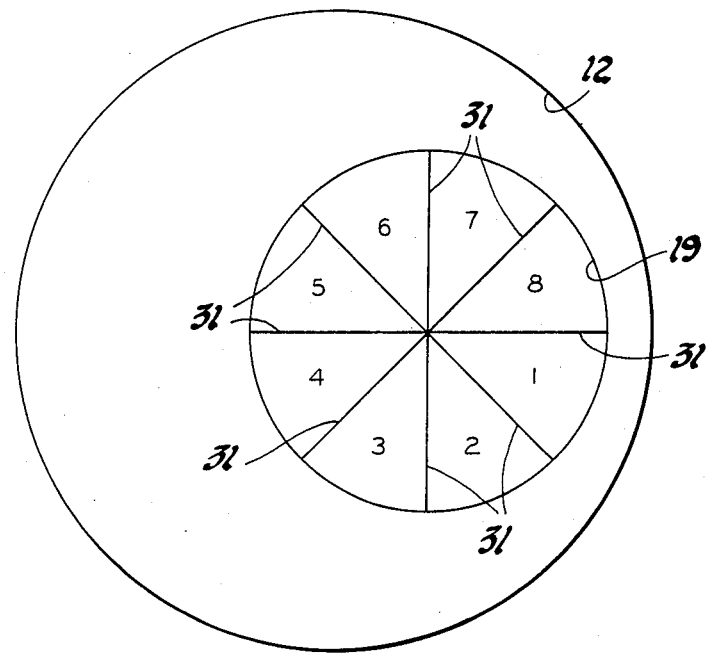
FIG. 4 is a schematic view illustrating the position of the intake port and vane defined passages relative to the engine cylinder.

It may be noted best from FIG. 4, but is also illustrated in FIGS. 2 and 3, that the vanes 31 divide the intake port into eight wedge shaped sections which have been numbered 1-8. The positioning of these sections relative to the cylinder 12 is also illustrated. It is seen that sections 1 and 8 lie closest to the cylinder wall with sections 2 and 7 slightly farther away. Sections 3-6 lie on the opposite side of the port from the portion closest to the adjacent cylinder wall.

Figure 5:
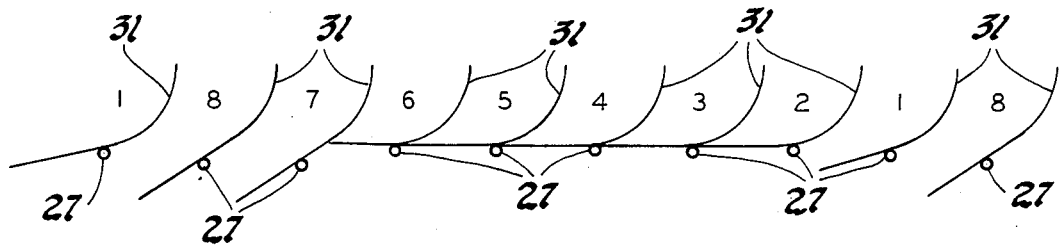
FIG. 5 is a schematic view illustrating the varying openings of the vane defined passages in the position illustrated in FIG. 3.

In accordance with a preferred form of the invention, at least some of the vanes controlling the wedge-shaped passages nearest the cylinder wall (e.g. 1,8,7,2) are arranged to be opened further during reduced load operation of the engine than the vanes controlling the wedge-shaped passages farther from the cylinder wall (e.g. 3-6). This is illustrated by FIG. 5 for a particular operating position of the selective swirl means where the passages 2-6 are largely blocked by their fully closed vanes 31, passage 1 has its vane slightly open while passages 7 and 8 have their vanes more fully open. This is accomplished by differences in the relative positions with respect to a horizontal plane of the pins 27 for the respective vanes. The pins for controlling the vanes of passage 2-6 lie in a common horizontal plane, while the pin of the vane for passage 1 is slightly lower and the pins engaging the vanes for passages 7 and 8 are still lower. In this way, the same angular rotation of the ring 30 and vanes 31 causes the vanes for the passages 2-6 to close sooner and open later than those of passage 1 and passages 7 and 8.

In operation, the arrangement described provides for full flow of intake mixture through the intake port 19 and into the cylinder 12 through vertically arranged vanes 31 and their controlled passages 1-8 when the vanes are aligned with their pins 27 as is preferably the case when full intake flow is required at high engine load operation. As engine load is reduced and it is desired to increase swirl of the cylinder charge to assist combustion, the cable 35 is moved axially to rotate the ring 30 together with the upper portions of the vanes 31 and the collar 32 clockwise as shown in FIGS. 2 and 3. This rotation first results in partial closing of all the vanes to impart a swirling motion to the air flow entering through all of the passages 1-8. Further movement of the cable 35 causes rotation of the vanes 31 to the positions shown in FIGS. 3 and 5, wherein the vanes controlling passages 2-6 are fully closed, that of passage 1 is slightly open and the vanes of passages 7 and 8 are more fully open, thus directing most of the intake flow through passages 1,7 and 8 which are closest to the cylinder wall. As a result, the smaller amount of intake mixture entering the intake port at reduced load is directed, at least primarily, through the passages 1,7, and 8, with their similarly angled vanes causing accentuated swirl within the cylinder and further accelerating combustion.

It should be obvious that, depending upon the specific arrangement of the engine and combustion chamber involved, variations in the best vane and passage locations for the most fully open passages may occur and may be best determined by testing of each individual case. However, it appears that, in general, swirl is accentuated most by the directing of flow into passages most closely adjacent to the cylinder wall which are arranged for moving the intake charge in a swirling direction by the use of vanes or other guide means. Obviously, any suitable form of guide means or vanes could be utilized in place of those illustrated in the disclosed embodiment. Accordingly, it is intended that the invention not be limited to the disclosed embodiment, but that it have the full scope permitted by the language of the following claims.

The embodiments of the invention in which an exclusive property or privilege is claimed are defined as follows:

1. The combination in an internal combustion engine of
    a cylinder having a peripheral wall and a closed end,
    means defining an intake port opening to the cylinder through the closed end, the port having an end portion adjacent to the cylinder with an edge near the peripheral wall,
    a poppet valve in the port reciprocably supported by the port defining means and engageable with the port defining means near the cylinder closed end for movement of the valve into open and closed positions to open and close communication between the port and the cylinder, and
    adjustable swirl means in said port end portion, said swirl means comprising a plurality of adjustable vanes supported in annularly spaced relation around said valve in said port end portion and extending in directions generally outwardly from the valve and longitudinally along the direction of flow through the port end portion and
    adjusting means to selectively adjust said vanes between open and flow restricting positions, said adjusting means providing sequential opening of at least certain of the vanes to impart varying degrees of swirl to fluid charges entering the cylinder through the intake port.

2. A combination as in claim 1 wherein said adjusting means are operative to open only vanes relatively close to the cylinder peripheral wall under conditions of most limited cylinder charging flow to maximize cylinder charge swirl, and to open vanes successively farther from the peripheral wall sequentially upon an increasing volume of charging flow, to thereby provide a reduced restriction to flow with reduced charge swirl.

3. The combination in an internal combustion engine of
    a cylinder having a peripheral wall and a closed end,
    means defining an intake port opening to the cylinder through the closed end, the port having an end portion adjacent to the cylinder with an edge near the peripheral wall,
    a poppet valve in the port having a head engageable with the port defining means near the cylinder closed end to close communication between the port and the cylinder and a stem connected with the head and extending centrally of the port end portion, the stem being reciprocably supported by the port defining means for movement of the valve longitudinally of the stem into open and closed positions, and
    adjustable swirl means in said port end portion adjacent to the valve head, said swirl means comprising a plurality of adjustable vanes supported in annularly spaced relation around said valve stem in said port end portion and extending in directions generally outwardly from the valve stem and longitudinally along the direction of flow through the port end portion and
    adjusting means to selectively adjust said vanes between open and flow restricting positions, said adjusting means providing sequential opening of at least certain of the vanes to swirl inducing positions to impart varying degrees of swirl to fluid charges entering the cylinder through the intake port.

4. A combination as in claim 3 wherein said adjusting means are operative to open only vanes relatively close to the cylinder peripheral wall under conditions of most limited cylinder charging flow to maximize cylinder charge swirl, and to open vanes successively farther from the peripheral wall sequentially upon an increasing volume of charging flow, to thereby provide a reduced restriction to flow with reduced charge swirl.

* * * * *